(12) United States Patent
Kawamura et al.

(10) Patent No.: US 11,941,498 B2
(45) Date of Patent: Mar. 26, 2024

(54) FACIAL MOTION DETECTION AND IMAGE CORRECTION METHOD AND APPARATUS

(71) Applicant: FUJITSU LIMITED, Kawasaki (JP)

(72) Inventors: Ryosuke Kawamura, Kawasaki (JP); Kentaro Murase, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 605 days.

(21) Appl. No.: 17/157,602

(22) Filed: Jan. 25, 2021

(65) Prior Publication Data
US 2021/0248357 A1 Aug. 12, 2021

(30) Foreign Application Priority Data
Feb. 12, 2020 (JP) .................. 2020-021932

(51) Int. Cl.
*G06K 9/46* (2006.01)
*G06N 20/00* (2019.01)
*G06V 10/774* (2022.01)
*G06V 40/16* (2022.01)

(52) U.S. Cl.
CPC ........... *G06N 20/00* (2019.01); *G06V 10/774* (2022.01); *G06V 40/165* (2022.01); *G06V 40/169* (2022.01); *G06V 40/176* (2022.01)

(58) Field of Classification Search
CPC ............ G06V 40/174–40/176; G06V 40/168–40/171; G06T 7/20–7/292
See application file for complete search history.

(56) References Cited

U.S. PATENT DOCUMENTS

2003/0133599 A1* 7/2003 Tian ................ G06V 40/175
382/118
2017/0286759 A1* 10/2017 Yao ................ G06V 40/164

FOREIGN PATENT DOCUMENTS

JP 2001-307123 A 11/2001
JP 2010-055395 A 3/2010

* cited by examiner

*Primary Examiner* — Brian Werner
(74) *Attorney, Agent, or Firm* — ArentFox Schiff LLP

(57) ABSTRACT

An image processing method executed by a computer, the method includes detecting a plurality of feature points of a face from an input image, referring to importance information that indicates an importance of a region within an image in a process of detecting a predetermined facial motion from the image, selecting, from the plurality of feature points detected by the detecting, one or more points that correspond to an image region including an importance indicated by the importance information equal to or smaller than a first threshold value, correcting the input image by using the one or more points selected by the selecting, to generate a corrected image; and determining whether or not the predetermined facial motion is occurring in the input image, based on an output obtained by inputting the corrected image to a recognition model.

7 Claims, 18 Drawing Sheets

FIG. 1

| AU NUMBER | MOTION OF AU |
|---|---|
| AU1 | RAISE THE INSIDE OF EYEBROWS |
| AU2 | RAISE THE OUTSIDE OF EYEBROWS |
| AU4 | LOWER EYEBROWS INSIDE |
| AU5 | RAISE THE UPPER EYELID |
| AU6 | RAISE CHEEK |
| AU7 | STRAIN EYELIDS |
| AU9 | CREASE NOSE |
| AU10 | RAISE THE UPPER LIP |
| AU12 | RAISE LIP TIP |
| AU14 | MAKE DIMPLE |
| AU15 | LOWER LIP TIP |
| AU16 | LOWER THE LOWER LIP DOWNWARD |
| AU17 | RAISE THE FRONT OF LIPS UPWARD |
| AU20 | PULL LIPS ASIDE |
| AU23 | COMPRESS LIPS |
| AU25 | OPEN LIPS |
| AU26 | LOWER JAW AND OPEN LIPS |
| ... | ... |

| PSYCHOLOGICAL STATE | CORRESPONDING AU |
|---|---|
| JOY | AU12, AU25 |
| ANGER | AU4, AU7, AU24 |
| SURPRISE | AU1, AU2, AU25, AU26 |
| JOYFUL SURPRISE | AU1, AU2, AU12, AU25 |
| SADNESS | AU4, AU15 |
| SAD ANGER, | AU4, AU7, AU15, AU17 |
| FEAR | AU1, AU4, AU20, AU25 |
| ... | ... |
| FEARFUL SURPRISE | AU1, AU2, AU5, AU20, AU25 |

200

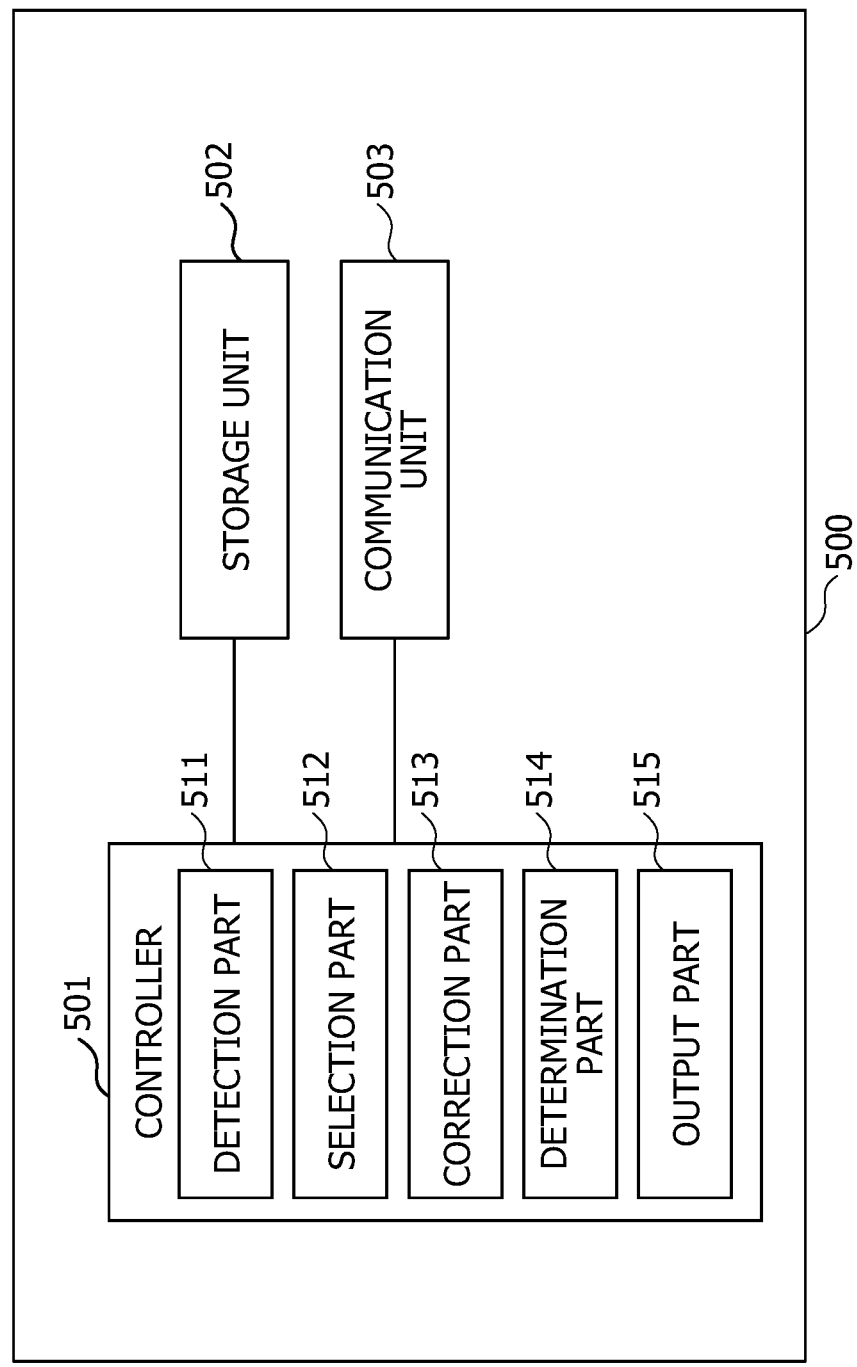

SMALL CHANGE OF OUTPUT VALUE OF CORRECT ANSWER

LARGE DECREASE OF OUTPUT VALUE OF CORRECT ANSWER

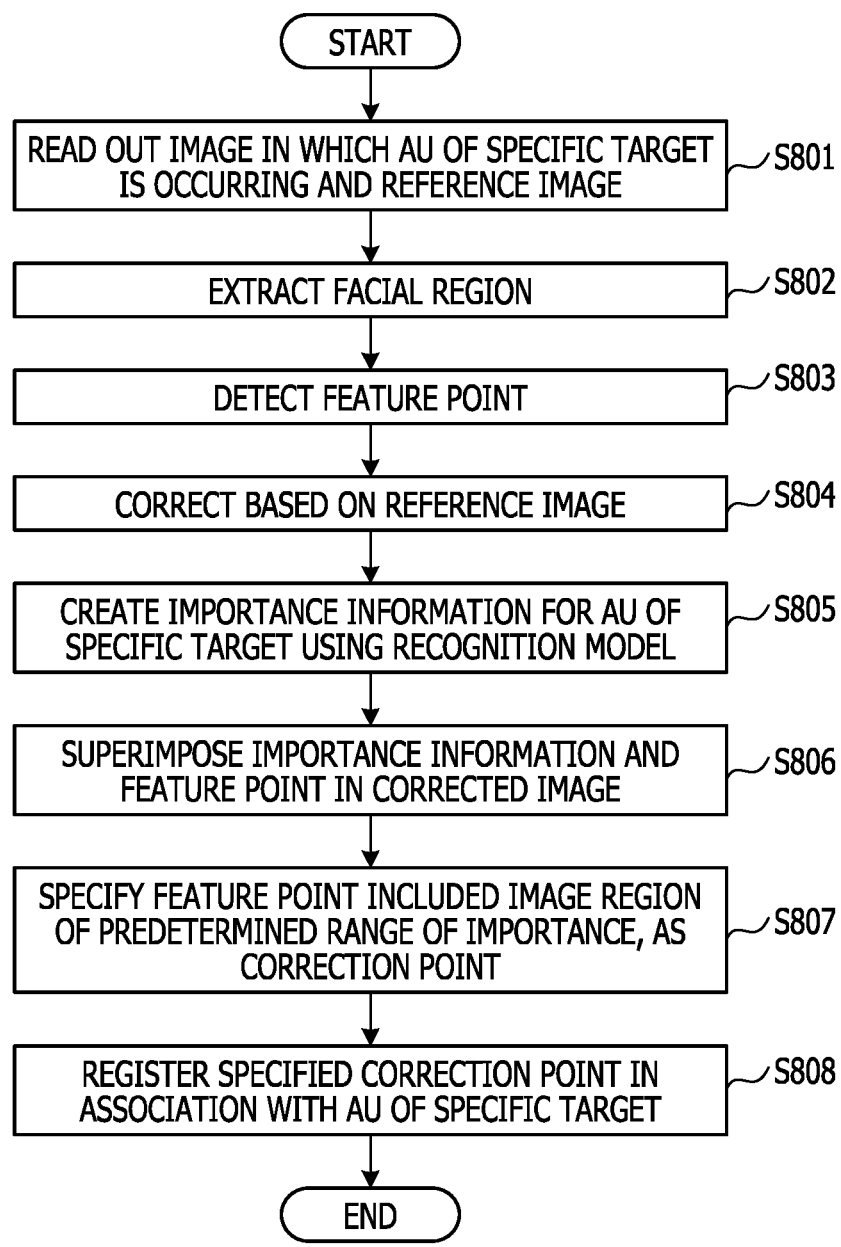

| AU NUMBER | CORRECTION POINT |
|---|---|
| AU1 | **, **, ... |
| AU2 | **, **, ... |
| AU4 | **, **, ... |
| AU5 | **, **, ... |
| AU6 | **, **, ... |
| ... | ... |

900

CORRECTION POINT IS SPECIFIED FOR EACH AU

AUx           AUy

FACIAL MOTION DETECTION AND IMAGE CORRECTION METHOD AND APPARATUS

CROSS-REFERENCE TO RELATED APPLICATION

This application is based upon and claims the benefit of the prior Japanese Patent Application No. 2020-021932, filed on Feb. 12, 2020, the entire contents of which are incorporated herein by reference.

FIELD

The embodiments discussed herein are related to an image processing methods and an image processing apparatus.

BACKGROUND

With the development of an image processing technology in recent years, a technology for detecting and using facial motions of human beings (e.g., facial expressions) has been developed. For example, a system has been developed which recognizes a subtle change in psychological state from the human facial motions, and performs a process according to the recognized change in psychological state.

In this regard, techniques related to the recognition of facial expressions are known (e.g., Japanese Laid-open Patent Publication Nos. 2010-055395 and 2001-307123).

SUMMARY

According to an aspect of the embodiments, an image processing method executed by a computer, the method includes detecting a plurality of feature points of a face from an input image, referring to importance information that indicates an importance of a region within an image in a process of detecting a predetermined facial motion from the image, selecting, from the plurality of feature points detected by the detecting, one or more points that correspond to an image region including an importance indicated by the importance information equal to or smaller than a first threshold value, correcting the input image by using the one or more points selected by the selecting, to generate a corrected image, and determining whether or not the predetermined facial motion is occurring in the input image, based on an output obtained by inputting the corrected image to a recognition model.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a view illustrating an example of action unit information;

FIG. 2 is a view illustrating an example of psychological state information;

FIG. 5 is a diagram illustrating a block configuration of an image processing apparatus according to an embodiment;

FIG. 8 is a diagram illustrating an example of an operation flow of a correction point specifying process based on importance information according to an embodiment;

DESCRIPTION OF EMBODIMENTS

Figure 3:
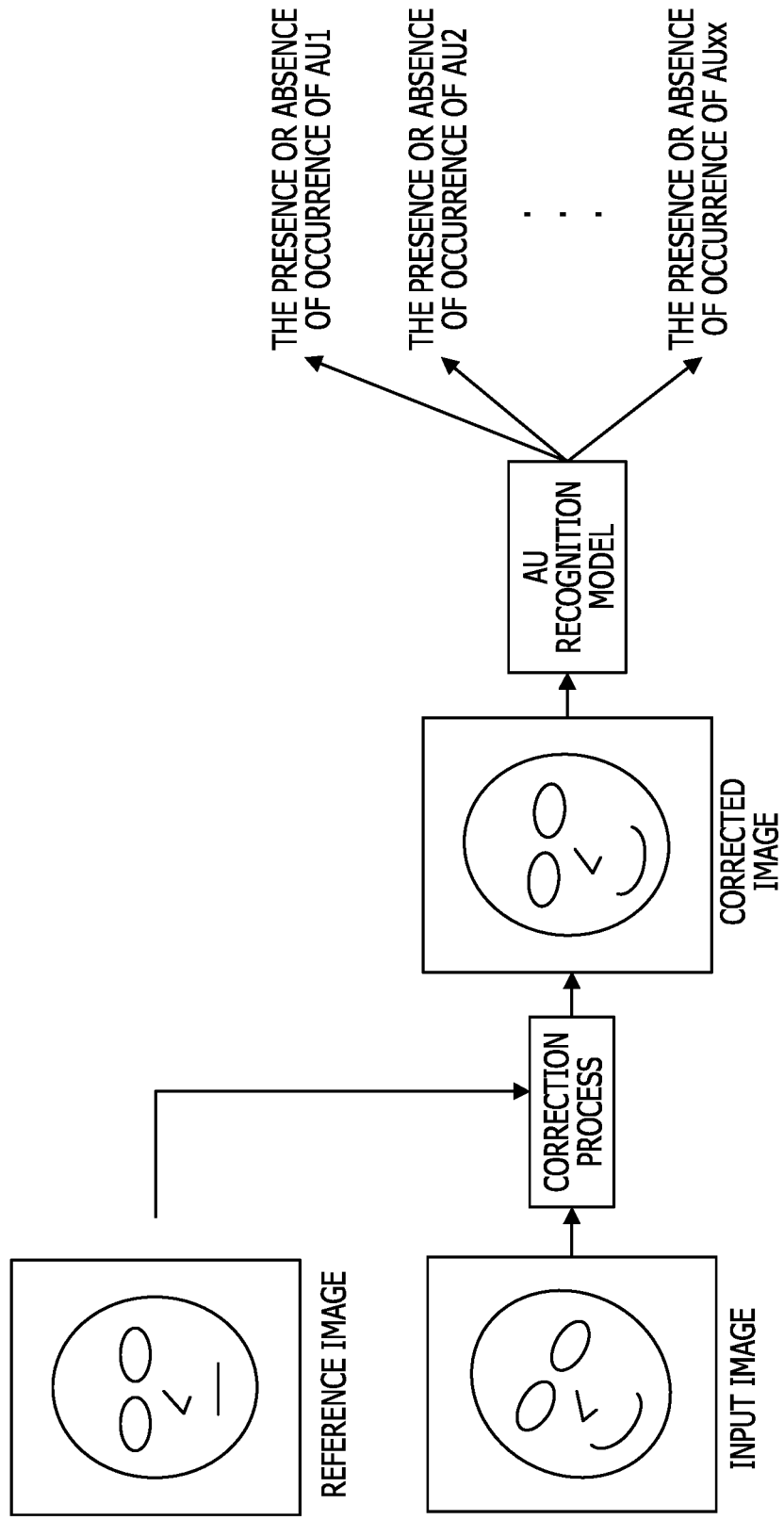
FIG. 3 is a diagram illustrating a process of detecting AU from an exemplary image.

In order to detect the motion of a face for various orientations of the face, a correction process according to the orientations of the face illustrated in an image is performed, and then a corrected image is input to the recognition model of a facial motion. However, a part of the face that the recognition model considers to be important when detecting the motion of the face differs depending on the motion. Therefore, when the face motion is detected using a uniformly corrected image without following the face motion to be detected, the detection accuracy of the face motion may decrease.

Hereinafter, embodiments of a technique for improving the detection accuracy of facial motions will be described in detail with reference to the accompanying drawings. In the meantime, corresponding components in the plurality of drawings will be denoted by the same reference numerals.

As described above, a technology for detecting the motion of the human face is being developed. For example, as a method for describing the facial expression of human being, the Facial Action Coding System (FACS) has been known. The FACS is based on the anatomical knowledge of facial muscles, and describes facial motions by coding the facial motions into action units (AUs) which are each the unit of facial motions. Various AUs are being defined, and each AU is assigned with an AU number starting with AU1.

FIG. 1 is a view illustrating an example of action unit information 100. In the action unit information 100 of FIG. 1, an AU number is registered in association with a motion of the AU that corresponds to the AU number. For example, AU4 represents a motion to lower the eyebrows inward. By using the AUs, it is possible to describe fine-grained changes in facial expressions. Further, by recognizing the changes in AUs, the psychological state may be estimated.

FIG. 2 is a view illustrating an example of psychological state information 200. In the psychological state information 200 of FIG. 2, a psychological state is registered in association with AU numbers detected from the facial expression of the psychological state. For example, when a person illustrated in an image is in joy, AU12 and AU25 tend to be detected from the facial expression of the person. Therefore, when AU12 and AU25 are detected from the facial expression of the person illustrated in the image, it may be determined that the person illustrated in the image is in joy. Then, for example, by detecting the AUs that is occurring in the facial expression of the person illustrated in the image, and specifying the psychological state that corresponds to the detected AUs from the psychological state information 200, it is possible to estimate the psychological state of the person illustrated in the image.

Meanwhile, for example, in order to recognize the AUs for various face orientations, facial feature points are used to perform a correction process according to the orientations of the face illustrated in the image, and then the corrected image is input to an AU recognition model.

FIG. 3 is a diagram illustrating a process of detecting the AUs from an exemplary image. For example, a reference image in which a person is illustrated in a preferable orientation for the AU recognition is prepared. The reference image may be, for example, an image in which a face is not tilted, faces forward, and has a size equal to or larger than a predetermined size.

Then, for example, as illustrated in FIG. 3, it is assumed that an input image such as an image in which a face is tilted is input as an AU detection target. In this case, first, the feature points of the face are detected from each of the reference image and the input image. Various face landmark detection methods for detecting the facial feature points are known. In an example, a method in which 68 feature points are detected from a face as landmarks may be used.

Figure 4:
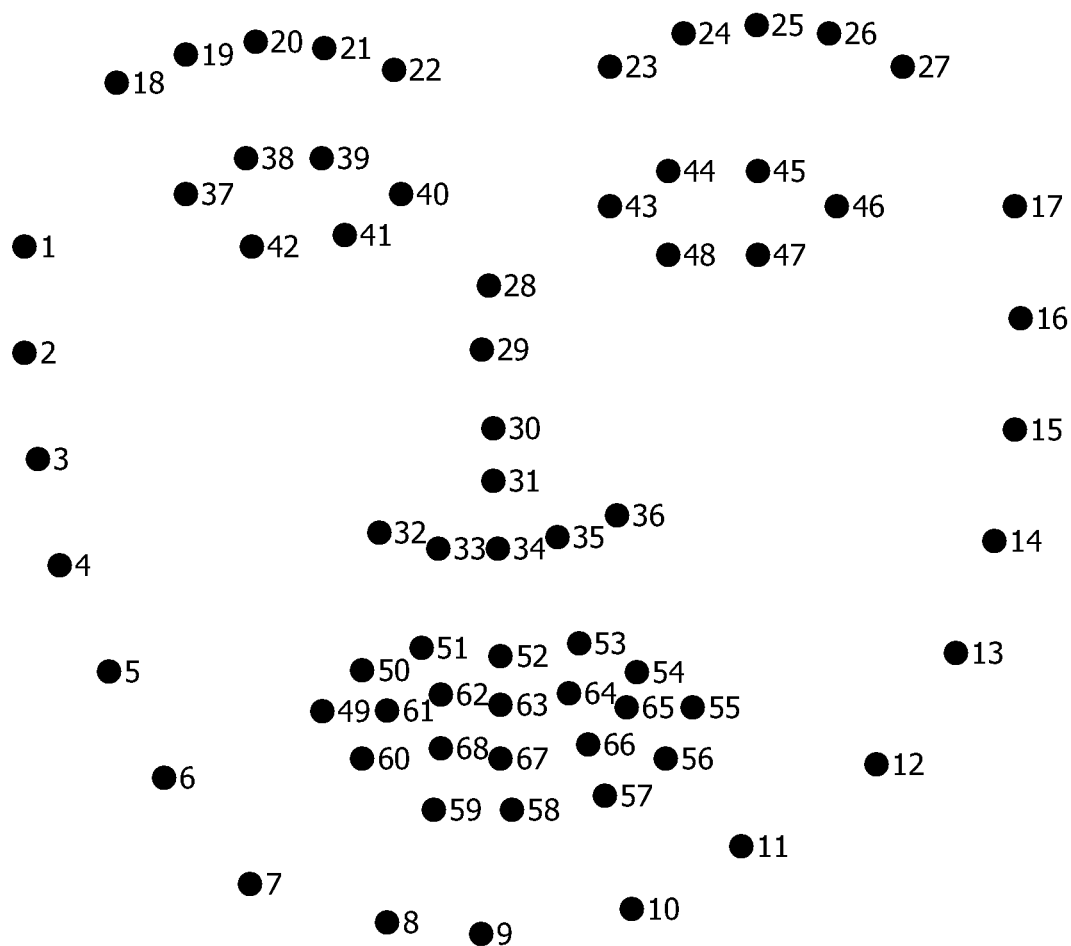
FIG. 4 is a diagram illustrating an example of facial feature points.

FIG. 4 is a diagram illustrating an example of 68 facial feature points. As illustrated in FIG. 4, the feature points are defined around the contour, eyes, nose, and mouth of the face. The feature points usable as facial landmarks in the embodiment are not limited to the 68 points illustrated in FIG. 4, but the number and the arrangement of feature points may be changed. Herein below, an example of detecting and using the 68 feature points in each of the reference image and the input image will be described.

Subsequently, a correction process is executed on the input image so as to reduce the influence of scale difference, motion, and rotation of the face of the person illustrated in the image. In the correction process, the input image may be corrected so as to match the arrangement of the feature points detected in the input image with the arrangement of the corresponding feature points detected in the reference image. The corresponding feature points in the input image and the reference image may be, for example, the feature points that are detected from both the input image and the reference image, and have the same numbers illustrated in FIG. 4. In an example, the Procrustes method may be used to correct the input image.

Subsequently, as illustrated in FIG. 3, the corrected image obtained by the correction process is input to the AU recognition model, and the AUs occurring in the corrected image are detected. Then, based on the psychological state information 200, the psychological state of the person illustrated in the image may be estimated from the detected AUs.

However, for example, a part of the face for which the recognition model considers to be important when a facial motion is detected may differ depending on the facial motion to be detected. For example, a part of the face which is important for the detection of an occurrence of an AU motion may differ between a case of detecting a motion of eyebrows as in AU1 and a case of detecting a motion of lips as in AU15.

Despite the fact, for example, as illustrated in FIG. 3, when the detection of various AU motions is performed using a common corrected image, the motion of the part of the face which is important for the AU detection may be suppressed by the correction depending on AUs. As a result, the detection accuracy of a facial motion may be deteriorated. Therefore, there is a demand for a technique capable of further improving the detection accuracy of a facial motion.

In an embodiment to be described herein below, preferable feature points used for a correction are specified for each facial motion to be detected. Then, the preferable feature points specified for each facial motion to be detected are used to generate a corrected image for each facial motion to be detected. Subsequently, the generated corrected image is input to the recognition model to detect the facial motion to be detected. In this way, a corrected image is individually generated for each facial motion to be detected, and input to the recognition model to detect the facial motion. Therefore, according to the embodiment, the detection accuracy of a facial motion may be improved. As a result, the recognition accuracy of a facial expression may also be improved.

In the following, an example of using the AUs as facial motions will be described, but the embodiment is not limited thereto. For example, in another embodiment, other facial motions may be used. In an example, the embodiment may be applied to a motion of each part of the face, such as a motion of the eyebrows and a motion of the mouth. Hereinafter, the embodiment will be described in more detail.

FIG. 5 is a diagram illustrating an example of a block configuration of an image processing apparatus 500 according to an embodiment. The image processing apparatus 500 may be an information processing apparatus that processes images, such as, for example, a personal computer (PC), a notebook PC, a tablet terminal, a server computer or the like. Further, the image processing apparatus 500 may execute a facial motion detection process according to an embodiment.

The image processing apparatus 500 includes, for example, a controller 501, a storage unit 502, and a communication unit 503. The controller 501 may control, for example, the entire image processing apparatus 500. The controller 501 includes, for example, a detector 511, a selector 512, a corrector 513, a determination unit 514, an output unit 515 and others, and may include other functional units. The storage unit 502 of the image processing apparatus 500 may store information such as action unit information 100, psychological state information 200, and correction point information 900 to be described later and the like. The communication unit 503 may communicate data with another apparatus according to, for example, an instruction of the controller 501. Details of each of the units and details of the information stored in the storage unit 502 will be described later.

Subsequently, descriptions will be made on specifying the feature points preferable to be used for generating a corrected image corresponding to a facial motion among a plurality of facial feature points. In the following, the feature points specified as points preferable to be used for a correction may be referred to as correction points.

[Specifying Correction Points Based on Importance Information]

The present inventors have focused on the fact that when a facial motion to be detected occurs, a region where a relatively small motion occurs around the region where the facial motion to be detected occurs contributes to the detection of the facial motion to be detected.

For example, importance information may be generated by evaluating an importance indicating which region in an image is important for the detection of a facial motion according to the recognition model, on the image in which the facial motion to be detected occurs. As an example, an importance map such as an occlusion sensitivity map may be used for the importance information. However, the importance information according to the embodiment is not limited to the occlusion sensitivity map, but may be information generated by other methods as long as the information indicates the importance of each region in an image for the detection of a facial motion.

Figure 6A:
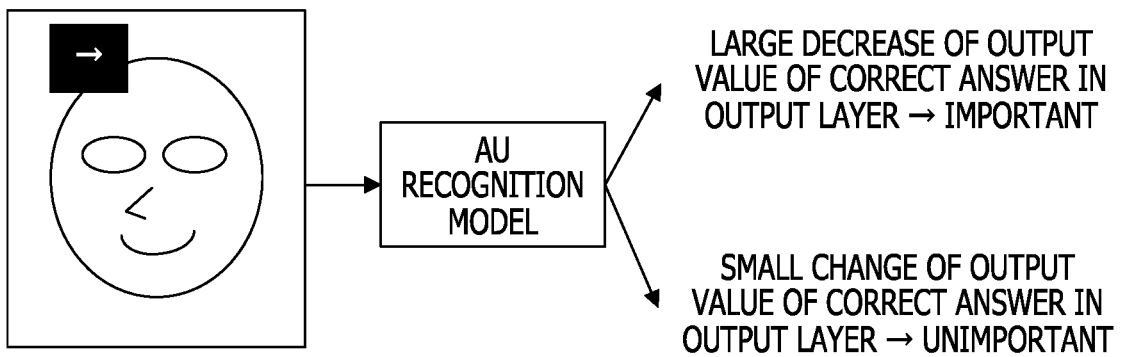
FIGS. 6A to 6D are views illustrating an example of a generation of an occlusion sensitivity map.

FIGS. 6A to 6D are diagrams illustrating an example of the generation of the occlusion sensitivity map. For example, as illustrated in FIG. 6A, in the generation of the occlusion sensitivity map, the controller 501 occludes a part of an image with a patch, and inputs the image to the recognition model. At this time, when the part occluded with the patch is a region that is important for the recognition in the recognition model, an output value of a correct answer decreases in an output layer. Meanwhile, when the part occluded with the patch is a region that is not important for the recognition in the recognition model, the output value of the correct answer does not change as much in the output layer.

Figure 6B:
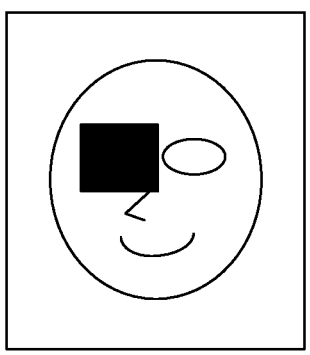
Figure 6C:
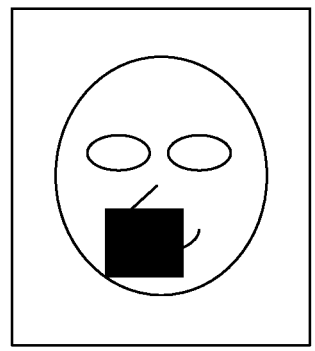

For example, FIGS. 6B and 6C represent the influence of the position of the patch on the output value of the correct answer in the output layer, when AU12: (the motion of pulling the corners of the lips up) is detected in the recognition model. Since AU12 relates to the motion of the lips, the influence on the recognition result of the recognition model is relatively small even though, for example, the eyes of the face are hidden as illustrated in FIG. 6B, and the change in output value of the correct answer is relatively small. Meanwhile, for example, when the lips are hidden with the patch as illustrated in FIG. 6C, the output value of the correct answer in the output layer significantly decreases.

For example, the controller 501 records a change in output value of the correct answer in the output layer in association with the position of the patch, while moving the patch so as to scan the image. Then, the controller 501 may evaluate the importance that indicates whether or not each region in the image is an important region for detecting the motion in the recognition model, from the degree of decrease in output value of the correct answer, and may generate the importance information based on the evaluation result.

Figure 6D:
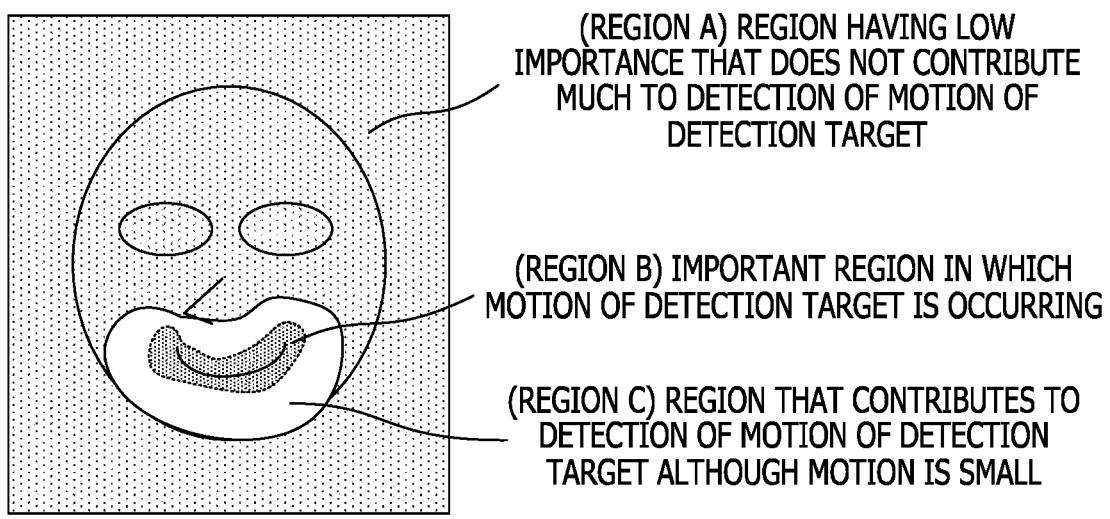

FIG. 6D illustrates an example of the importance information generated in the recognition model of AU12 for the image in which the motion of AU12 is occurring. As illustrated in FIG. 6D, the motion of the AU12 to be recognized hardly propagates in a region far away from an AU12 generation site even in the face, and the region represents a uniformly low importance which is not significantly different in importance from a region unrelated to the facial expression such as the background (e.g., region A in FIG. 6D). Meanwhile, since AU12 relates to the motion of the lips, the region around the lips where the motion is occurring represents a relatively high importance (e.g., region B in FIG. 6D). Further, around the important region where the motion to be detected is occurring (e.g., region B in FIG. 6D), there exists a region having a predetermined range of importance that contributes to the detection of the motion to be detected although a relatively small motion occurs (e.g., region C in FIG. 6D). In the embodiment, the feature points included in the region having the predetermined range of importance are specified as correction points used for generating a corrected image to be input to the recognition model that detects the facial motion to be detected.

Figure 7:
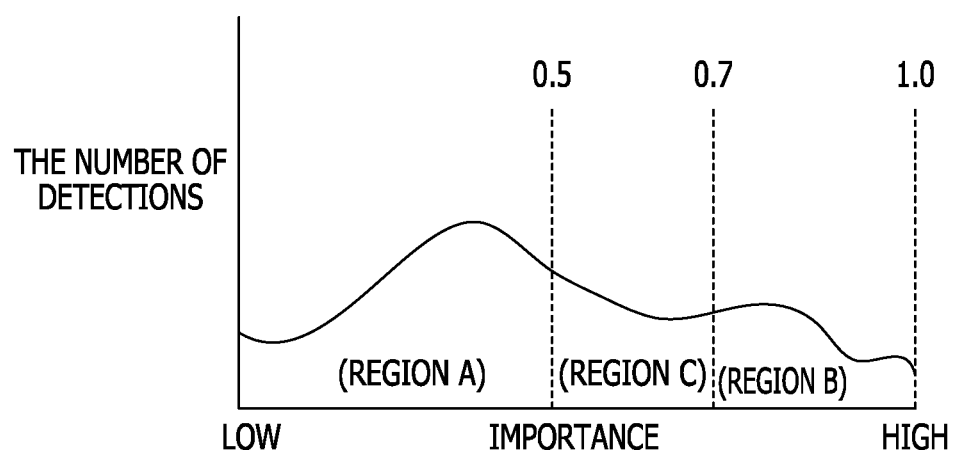
FIG. 7 is a diagram illustrating an example in which a region having a predetermined range of importance is represented by using a histogram of importance.

FIG. 7 is a diagram illustrating an example in which the region having the predetermined range of importance is represented by using a histogram of importance. In the histogram of FIG. 7, the horizontal axis represents the importance, and the vertical axis represents the number of detections of the importance. In the example of FIG. 7, the maximum importance detected in the image is set to 1.0 to normalize the importance. In this case, the controller 501 may specify a region having a predetermined range of importance which is, for example, equal to or lower than a first threshold value and equal to or higher than a second threshold value, as the image region corresponding to the region that contributes to the detection of the motion to be detected although a relatively small motion occurs (region C in FIG. 6D). The predetermined range may have upper and lower limits, for example, a value in the range of 0.4 to 0.6 for the importance of the lower limit used as the second threshold value and a value in the range of 0.7 to 0.9 for the importance of the upper limit used as the first threshold value. In an example, the predetermined range may be the range of 0.5 to 0.7. In this case, for example, a region of importance less than 0.5 in FIG. 7 may correspond to the region A in FIG. 6D, and a region of importance higher than 0.7 in FIG. 7 may correspond to the region B in FIG. 6D. In the embodiment, for example, the controller 501 may specify the feature points included in the region having the predetermined range of importance around the region important for recognizing the motion to be detected according to the recognition model described above, as correction points to be used for a correction.

In an example, the predetermined range of importance used to extract the correction points may be set as follows. For example, the upper limit of the predetermined range may be set so as not to include the feature points where a predetermined or higher degree of motion is occurring, and so as to include the nearby feature points where a predetermined or lower degree of motion is occurring. In addition, the lower limit of the predetermined range may be set so as to exclude the region unrelated to the facial expression such as the background or the face region far away from the region where the motion to be detected is occurring, and so as to include the region having the predetermined or higher importance that contributes to the detection of the motion to be detected according to the recognition model to some extent. For example, the predetermined range may be individually determined for each motion to be detected. Further, for example, the predetermined range may be set based on an empirical rule so as to extract the region that satisfies the requirements described above.

For example, the positions of the feature points included in the region having the predetermined range of importance set as described above contribute to the detection of the motion to be detected, although the motion of their positions is relatively small. Therefore, by correcting the input image so that the positions of these feature points match the positions in the reference image, the image may be corrected while preserving the motion to be detected in the region having the relatively high importance within the image.

Therefore, it is possible to generate a corrected image suitable for detecting the motion to be detected, by specifying the feature points included in the region having the predetermined range of importance as described above, as the correction points, and performing the correction process using the points corresponding to the correction points. Then, it is possible to improve the detection accuracy of motion by inputting the generated corrected image to the recognition model to execute the motion detection. Therefore, according to the embodiment, the recognition accuracy of facial expression may be improved. In another embodiment, the controller 501 may specify, for example, the region having the importance equal to or lower than the first threshold value as the image region having the predetermined range of importance.

Subsequently, an example of an operation flow of a correction point specifying process based on the importance information described above will be described. FIG. 8 is a diagram illustrating the operation flow of the correction point specifying process based on the importance information according to the embodiment. For example, the controller 501 may start the operation flow of FIG. 8 when an AU to be subjected to the correction point specifying process is designated, and an instruction to execute the correction point specifying process is input.

In operation S801 (hereinafter, each operation is described as "S," for example, S801), the controller 501 reads out an image in which an AU subjected to the correction point specifying process is occurring, and a reference image.

In S802, the controller 501 extracts a face region from each of the image in which the AU subjected to the correction point specifying process is occurring, and the reference image.

In S803, the controller 501 detects the feature points from the face region in each of the images in which the AU subjected to the correction point specifying process is occurring, and the reference image.

In S804, the controller 501 corrects the image in which the AU subjected to the correction point specifying process is occurring, based on the reference image. In an example, the controller 501 may correct the image in which the AU subjected to the correction point specifying process is occurring, so that the positions of predetermined feature points match the positions of the corresponding feature points in the reference image, to generate a corrected image. In an example, the predetermined feature points used for the correction may not rely on the occurring AU, and may be the feature points where a motion or individual difference is relatively small.

In S805, the controller 501 generates the importance information using the recognition model. The recognition model used for the generation of the importance information may be, for example, a recognition model learned to detect the presence or absence of the occurrence of the AU subjected to the correction point specifying process. In an example, the recognition model may be a recognition model individually generated for each AU, by performing a learning using image data labelled with the presence or absence of the occurrence of the AU subjected to the correction point specifying process as teacher data. Further, in another embodiment, as illustrated in FIG. 3, the recognition model may be a recognition model learned to specify an AU occurring in an image by using teacher data in which a plurality of images in which various AUs occur are labeled with AUs occurring in the images.

In S806, the controller 501 superimposes the importance information generated for the corrected image and the feature points detected from the corrected image.

In S807, the controller 501 specifies the feature points included in the image region having the predetermined range of importance in the importance information, as correction points. In an example, the predetermined range may be set as described above with reference to FIG. 7.

In S808, the controller 501 registers the specified correction points in the correction point information 900 in association with the AU subjected to the correction point specifying process, and stores the correction point information 900 in which the correction points are registered, in the storage unit 502. Then, the operation flow ends.

Figures 9A, 9B:
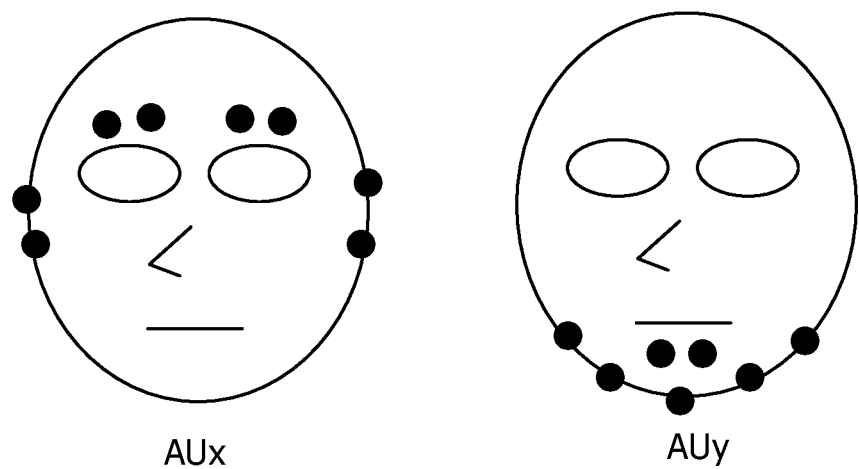
FIGS. 9A and 9B are views illustrating an example of correction point information according to an embodiment

FIGS. 9A and 9B are views illustrating an example of the correction point information 900 according to the embodiment. FIG. 9A represents an example of the correction point information 900. In the correction point information 900, an AU number is registered in association with correction points used for the correction process at the time of detecting the AU. In specifying the correction points based on the importance information described with reference to FIGS. 6A to 8, the correction points are individually specified for each AU, and therefore, for example, as illustrated in FIG. 9B, the correction points may be different from each other in different AUs, and the correction suitable for each AU can be performed.

Further, in specifying the correction points based on the importance information, the feature points present around the region where the motion of AU to be detected is occurring are specified as the correction points. Therefore, by correcting an image so that these correction points match the arrangement in the reference image, the image may be corrected so that the motion to be detected is preserved in the region having the relatively high importance within the image. Then, the detection accuracy of motion may be improved by inputting the obtained corrected image to the recognition model and executing the motion detection. Therefore, according to the embodiment, the recognition accuracy of facial expression may be improved.

[Specifying Correction Points Based on Magnitude of Motion According to Occurrence of Motion of AU]

Next, descriptions will be made on a process of specifying the feature points in which the magnitude of a motion according to the occurrence of an AU motion is relatively small, as correction points for each AU. For example, since the feature points where a relatively small motion occurs when an AU motion to be detected occurs may be corrected by suppressing the influence on the AU motion to be detected, it is preferable to use the feature points as the correction points when the AU is detected. Therefore, in the embodiment, for each AU, the feature points where a relatively small motion occurs even though the AU motion occurs are specified as the correction points used for the correction.

Figure 10:
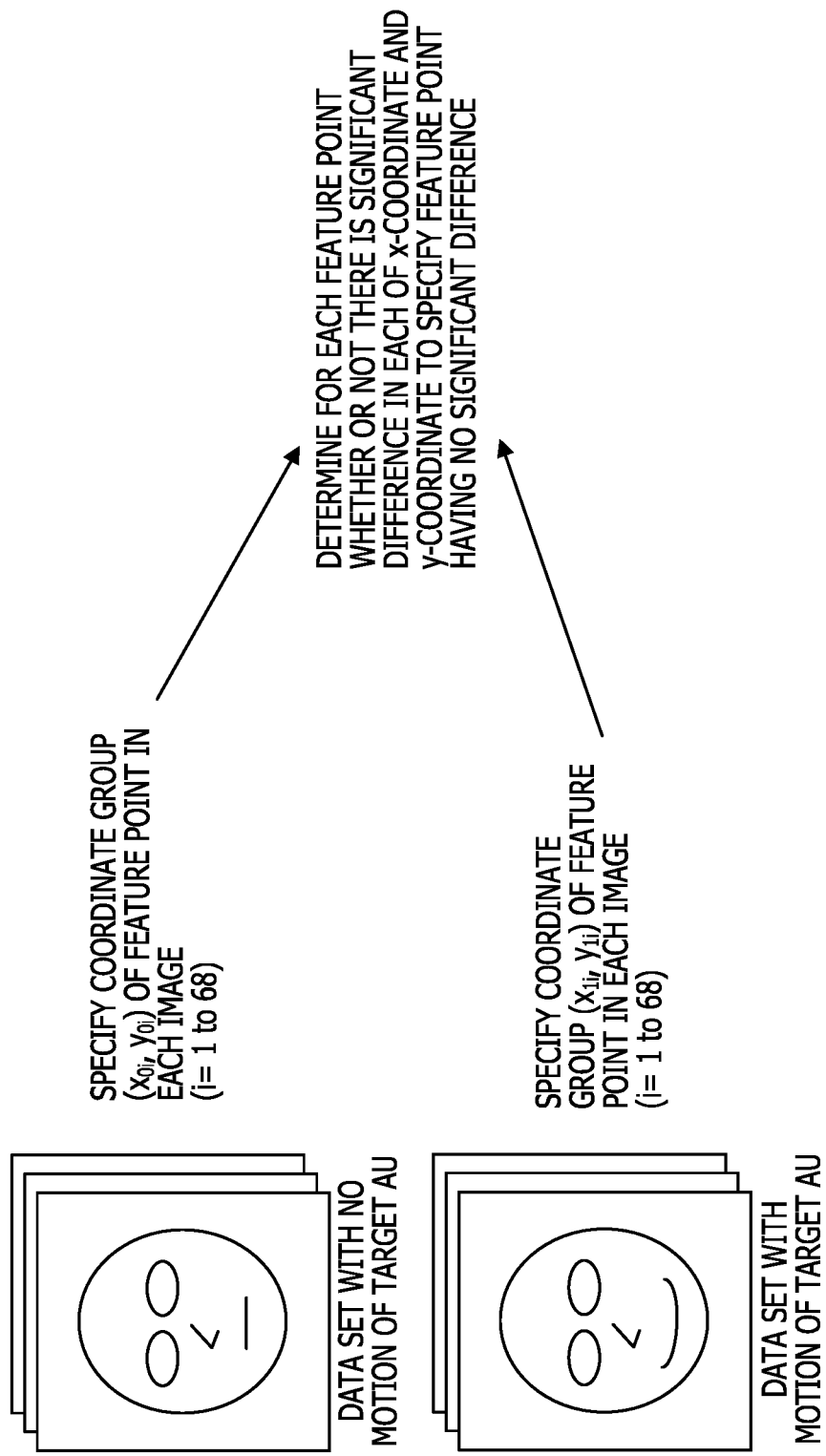
FIG. 10 is a diagram illustrating an example where correction points are specified based on the magnitude of a motion according to an embodiment.

FIG. 10 is a diagram illustrating an example of a case where the feature points where a relatively small motion occurs are specified for each AU according to an embodiment. For example, a plurality of images in which an AU motion subjected to the correction point specifying process is not occurring is prepared. In addition, images in which the AU motion subjected to the correction point specifying process is occurring, corresponding to the plurality of images in which the AU motion subjected to the correction point specifying process is not occurring, are further prepared. In an example, an image in which the AU motion subjected to the correction point specifying process is occurring and a corresponding image in which the AU motion subjected to the correction point specifying process is not occurring may be an image captured in a state where a person conducts the target AU motion and an image captured in a state where the same person does not conduct the target AU motion, respectively, under the same image capturing condition within a predetermined allowable range. The image capturing condition may include, for example, an image capturing distance from a subject, an image capturing angle, and a state of light hitting.

Subsequently, the feature points are detected in each of the prepared image data set in which the target AU motion is not occurring and the prepared image data set in which the target AU motion is occurring, and a coordinate group of each feature point is output. For example, it is assumed that the coordinate of each of the 68 feature points extracted from an image in which the target AU motion is not occurring is (x0i, y0i) (i=1 to 68). Further, it is assumed that the coordinate of each of the 68 feature points extracted from an image in which the target AU motion is occurring is (x1i, y1i) (i=1 to 68).

In this case, the controller 501 determines whether or not a coordinate difference between a coordinate group of (x0i, y0i) and a coordinate group of (x1i, y1i) for each feature point of the corresponding images is equal to or smaller than a threshold value (e.g., a third threshold value). Then, the controller 501 may specify a feature point whose coordinate difference is equal to or smaller than the threshold value, as a feature point where a relatively small motion occurs when the target AU occurs. For example, a significant difference may be used as the threshold value. That is, when there is no significant difference in either the x-coordinate or the y-coordinate between the (x0i, y0i) coordinate group and the (x1i, y1i) coordinate group, the controller 501 may determine that the coordinate difference is equal to or smaller than the threshold value. The presence or absence of the significant difference may be determined by using a statistical method or may be determined by using a t-test in an example. In another embodiment, the controller 501 may specify a feature point in which a distance between the coordinates of (x0i, y0i) and (x1i, y1i) is equal to or less than a predetermined ratio with respect to a distance between the generated maximum coordinates, as the feature point whose coordinate difference is equal to or smaller than the threshold value. In an example, the predetermined ratio may be a value in a range of 10% to 20%.

Then, the controller 501 may specify, for example, the specified feature point where a relatively small motion occurs even when the target AU motion occurs, as a correction point. For example, as described above, a feature point in which a difference between each of a plurality of feature points included in a first image in which a predetermined facial motion is occurring and each of a plurality of feature points included in a second image in which the predetermined facial motion corresponding to the first image is not occurring is equal to or smaller than the third threshold value may be specified as a correction point.

Subsequently, an example of an operation flow of the correction point specifying process based on the magnitude of a motion described above will be described.

Figure 11:
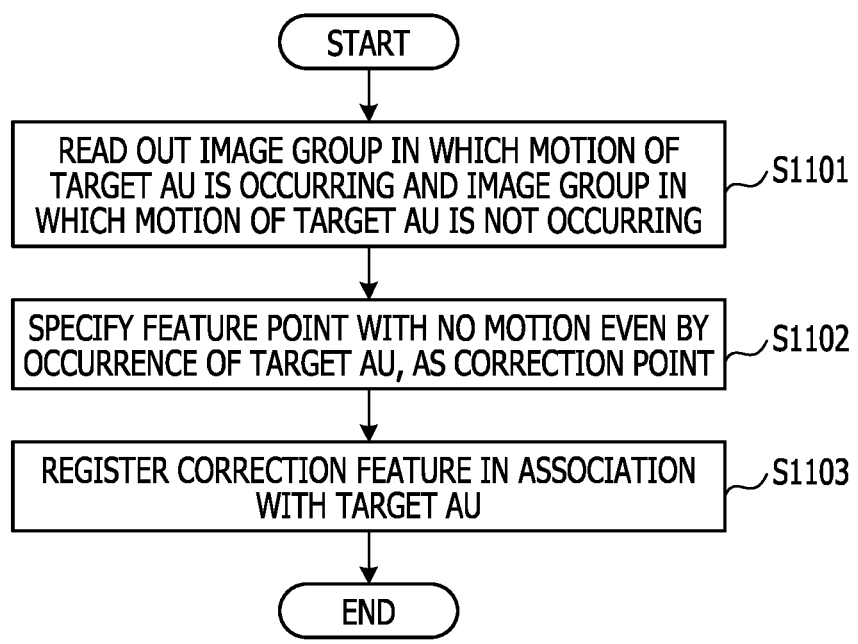
FIG. 11 is a view illustrating an operation flow of the correction point specifying process based on the magnitude of a motion according to an embodiment.

FIG. 11 is a view illustrating the operation flow of the correction point specifying process based on the magnitude of a motion according to an embodiment. For example, the controller 501 may start the operation flow of FIG. 11 when an instruction to execute the correction point specifying process based on the magnitude of a motion is input.

In S1101, the controller 501 reads out an image group in which the motion of the specific target AU of a correction point is occurring and an image group in which the motion of the specific target AU of the correction point is not occurring.

In S1102, the controller 501 specifies the feature points where a relatively small motion occurs even when an AU motion subjected to the correction point specifying process occurs. For example, as described in FIG. the controller 501 may specify the feature points where a relatively small motion occurs even when the target AU occurs, by comparing the coordinates of the feature points between the images in which the target AU motion is not occurring and the images in which the target AU motion is occurring.

In S1103, the controller 501 registers the feature points where a relatively small motion occurs, as correction points, in the correction point information 900 in association with the target AU, and stores the correction point information 900 in which the correction points are registered, in the storage unit 502. Then, the operation flow ends. As described above with reference to FIG. 9, for example, the AU numbers and correction points used in the correction process at the time of detecting the AU may be registered in association with each other in the correction point information 900.

Meanwhile, even in specifying the correction points based on the magnitude of the motion of the feature points described above with reference to FIGS. 10 to 11, the correction points are individually specified for each AU, and therefore, for example, as illustrated in FIG. 9B, the specified correction points may be different from each other for different AUs. Therefore, by performing the correction process using the correction points specified based on the motion of the feature points, it is possible to perform the correction suitable for each AU.

Figure 12:
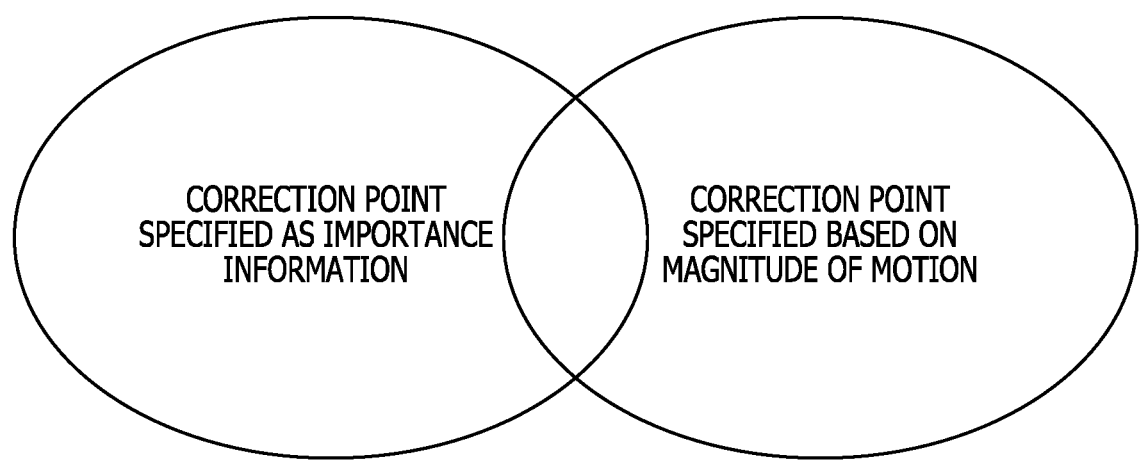
FIG. 12 is a diagram illustrating an intersection of correction points specified by the importance information and correction points specified based on the magnitude of a motion.

Further, as illustrated in FIG. 12, the correction points registered in the correction point information 900 for each AU may be an intersection of the correction points specified by the importance information and the correction points specified based on the magnitude of the motion of the feature points. In this case, a correction process for an image is executed based on the correction points commonly specified in the correction point specifying process based on the importance information and the correction point specifying process based on the magnitude of a motion. Further, in another embodiment, either one of the correction points specified based on the importance information or the correction points specified based on the magnitude of the motion of the feature points may be registered in the correction point information 900. In still another embodiment, the union of the correction points specified based on the importance information and the correction points specified based on the magnitude of the motion of the feature points may be registered in the correction point information 900. Further, the correction points specified based on the importance information and the correction points specified based on the magnitude of the motion of the feature points may be individually registered in a distinguishable form in the correction point information 900.

Then, as described above, by performing the image correction process based on the correction points specified for each AU, it is possible to perform the correction suitable for each AU. Therefore, according to the embodiment, the detection accuracy of AU may be improved. Hereinafter, the correction process based on the correction points specified for each AU and the AU detection process will be described.

Figure 13:
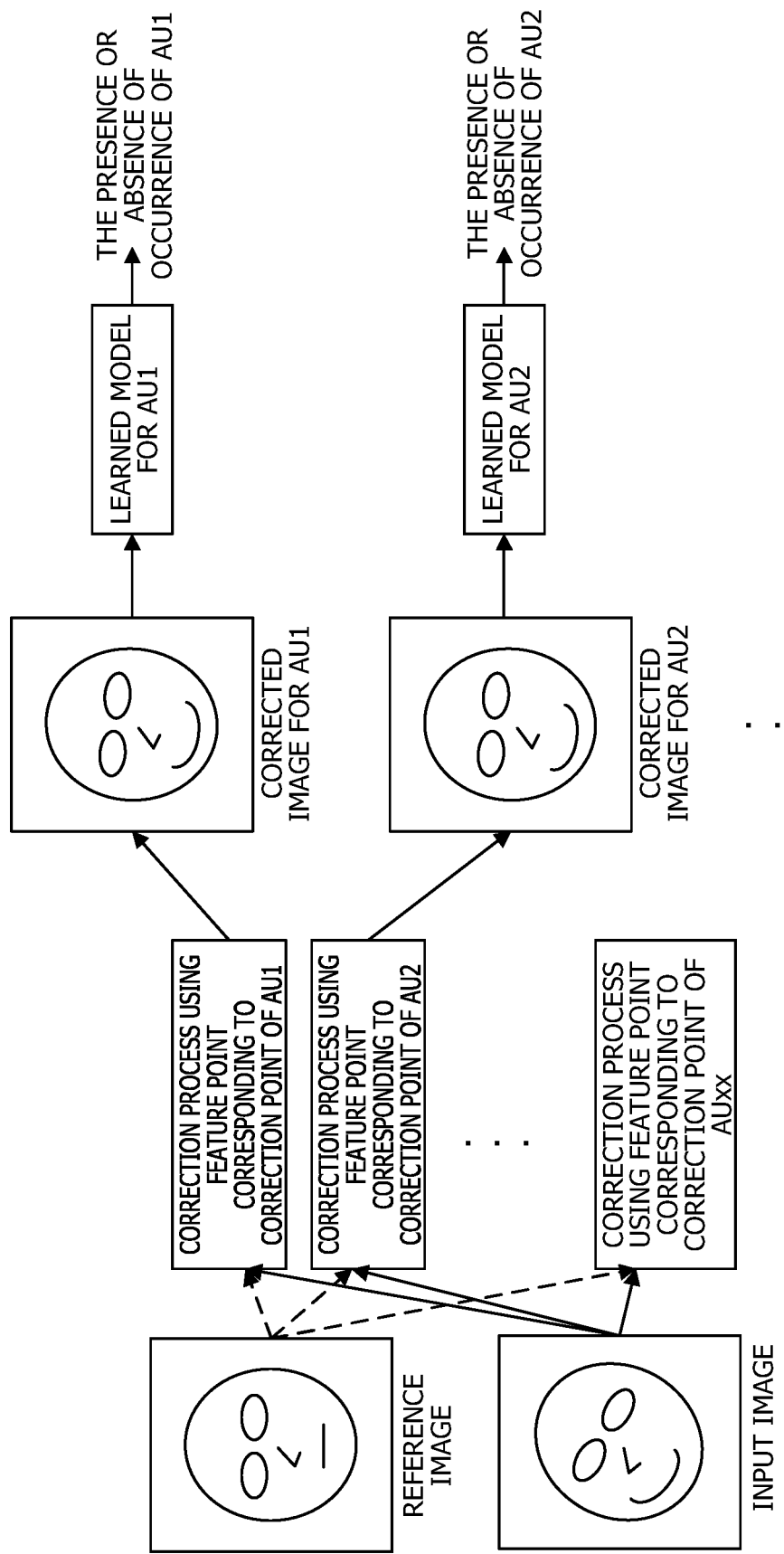
FIG. 13 is a diagram illustrating an example of a flow of a correction process and an AU detection process according to an embodiment.

FIG. 13 is a diagram illustrating an example of a flow of the correction process and the AU detection process according to an embodiment. For example, a reference image in which a person appears in a preferable direction for the AU recognition is prepared. For example, the reference image may be an image in which the face is not tilted, facing forward, and has a size equal to or larger than a predetermined size. Then, for example, as illustrated in FIG. 13, it is assumed that an input image such as the image in which the face is tilted is input as a facial expression determination target.

In this case, the controller 501 detects the feature points of the face in each of the reference image and the input image. Then, the controller 501 reads out the information of the correction points for each AU from the correction point information 900, specifies one or more feature points corresponding to the read correction points, and corrects the input image so that the arrangement of the specified one or more feature points matches the arrangement in the reference image. As a result, the controller 501 may generate a corrected image for each AU. For example, in FIG. 13, the one or more feature points corresponding to the correction points for each AU read from the correction point information 900 are used to generate a corrected image for each AU such as a corrected image for AU1, a corrected image for AU2, and so on.

Then, the controller 501 may input the corrected image for each AU generated as described above to the recognition model for each AU to detect the presence or absence of the occurrence of the target AU. For example, in FIG. 13, the controller 501 inputs the corrected image for AU1 to the recognition model for AU1 to determine whether or not AU1 occurs. Further, the controller 501 inputs the corrected image for AU2 to the recognition model for AU2 to determine whether or not AU2 occurs.

The recognition model for each AU may be generated, for example, as follows. First, the image data labeled with the presence or absence of the occurrence of an AU subjected to a recognition model generation process is prepared. Then, the controller 501 corrects the image data labeled with the presence or absence of the occurrence of the target AU by using the feature points corresponding to the correction points of the correction point information 900 corresponding to the target AU to generate a corrected image for the target AU. Subsequently, the controller 501 may generate the recognition model for the target AU by learning the recognition model so as to detect the target AU using the obtained corrected image for the target AU as teacher data. Hereinafter, the recognition model generation process for each AU will be further described.

Figure 14:
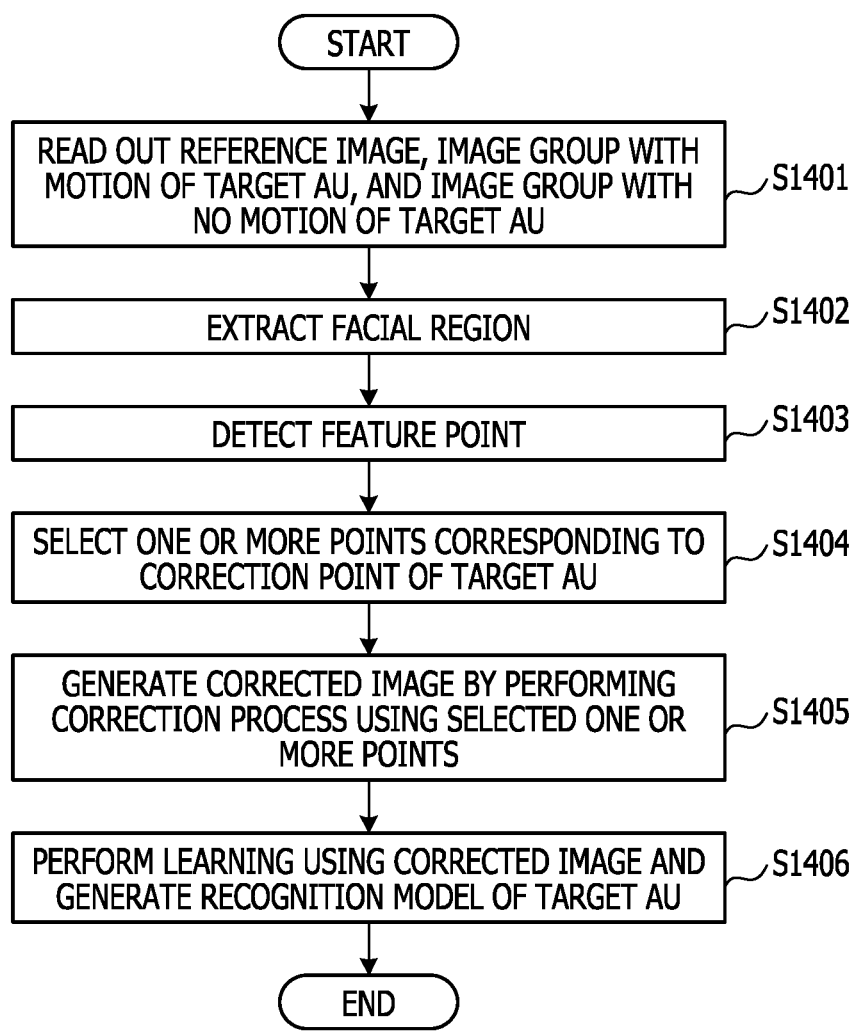
FIG. 14 is a diagram illustrating an operation flow of a process of generating a recognition model for each AU according to an embodiment.

FIG. 14 is a diagram illustrating an operation flow of the recognition model generation process for each AU according to an embodiment. For example, the controller 501 may start the operation flow of FIG. 14 when an instruction to execute the recognition model generation process is input together with a designation of an AU subjected to the recognition model generation process.

In S1401, the controller 501 reads out a reference image, an image group with motion of the target AU that generates the designated recognition model, and an image group without motion of the target AU.

In S1402, the controller 501 extracts a face region from the read image. In S1403, the controller 501 detects facial feature points from the face region of the read image.

In S1404, the controller 501 acquires information of the correction points corresponding to the target AU from the correction point information 900, and selects one or more points corresponding to the correction points from the detected facial feature points.

In S1405, the controller 501 corrects the image group with motion of the target AU and the image group without motion of the target AU so that the selected one or more points match the arrangement of one or more feature points corresponding to the correction points in the reference image, to generate a corrected image.

In S1406, the controller 501 uses the corrected image labeled with the presence or absence of the motion of the target AU, as teacher data, to generate a learned recognition model that has been learned to determine whether or not the motion of the target AU is occurring. Then, the operation flow ends. The model learning may be performed using various known machine learning methods such as, for example, deep learning and support vector machines.

As described above, for example, based on the correction points for each target AU registered in the correction point information 900, the feature points corresponding to the correction points are specified, and the image correction is performed using the feature points corresponding to the correction points. Then, by learning the model using the generated corrected image, it is possible to generate a recognition model for detecting the presence or absence of the occurrence of the target AU. Meanwhile, for example, by executing the machine learning using a plurality of corrected images obtained by correction using an image region having a predetermined range of importance, as teacher data, a recognition model for detecting the presence or absence of the occurrence of the target AU may be generated. Then, the presence or absence of AU generation may be detected for each AU using the recognition model generated for each AU.

Figure 15:
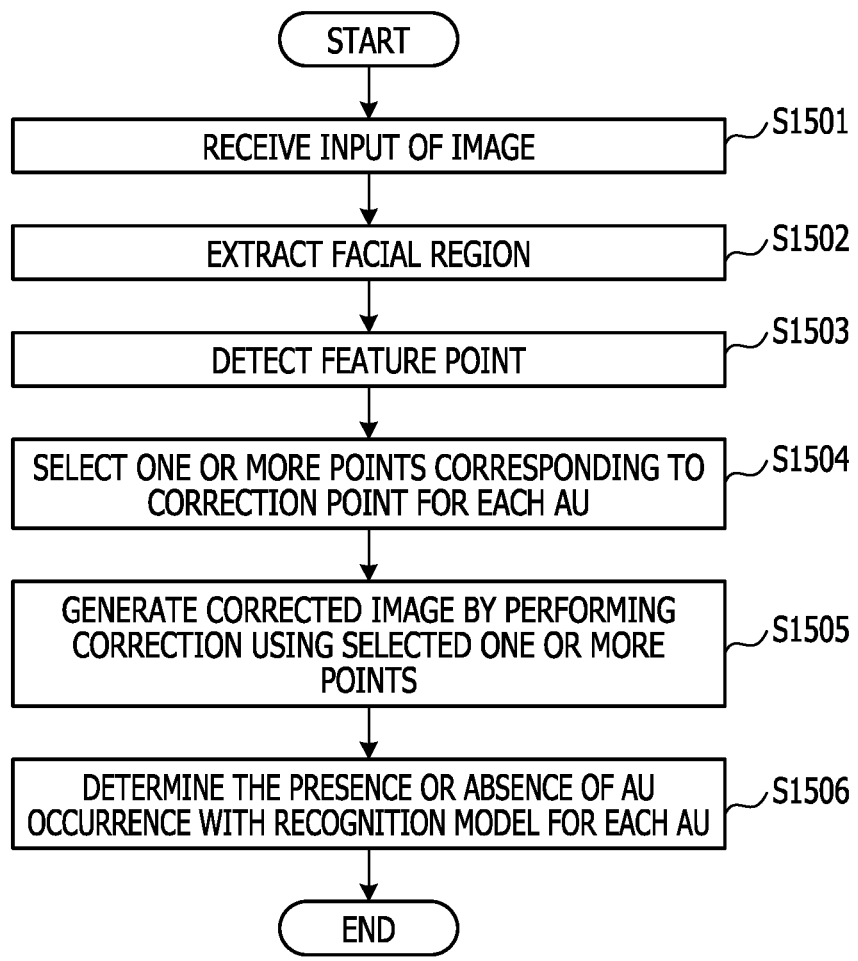
FIG. 15 is a diagram illustrating an operation flow of an AU recognition process using an AU recognition model generated for each AU.

FIG. 15 is a diagram illustrating an operation flow of AU recognition process using the recognition model generated for each AU. For example, the controller 501 may start the operation flow of FIG. 15 when an instruction to execution the AU recognition process.

In S1501, the controller 501 receives input of a target image for detecting the presence or absence of AU. For example, the controller 501 may read an image designated by a user from the storage unit 502.

In S1502, the controller 501 extracts a face region from the input image. Then, in S1503, the controller 501 detects feature points from the face region.

In S1504, the controller 501 refers to the correction point information 900 to select one or more feature points corresponding to correction points for each AU from the feature points detected from the face region.

In S1505, the controller 501 performs a correction process using the one or more feature points selected for each AU to generate a corrected image for each AU.

In S1506, the controller 501 inputs the corrected image generated for each AU to the recognition model for each corresponding AU, and determines whether or not AU occurs. Then, the operation flow ends. Meanwhile, the recognition model for each AU may be, for example, a recognition model in which learning is performed using the corrected image generated for each AU generated in the operation flow of FIG. 14. Then, since the corrected image is generated using the one or more feature points corresponding to the correction points specified for each AU and the presence or absence of the occurrence of AU is determined using the recognition model generated for each AU, it is possible to detect the AU occurring in the input image with a high accuracy. Therefore, according to the embodiment, the recognition accuracy of the facial expression may be improved.

A process according to the embodiment including the process of the operation flow described above may be implemented either in one apparatus such as the image processing apparatus 500, or, in another embodiment, the process may be implemented in cooperation with a plurality of apparatuses. For example, the process according to the embodiment may be implemented in a server computer and a client terminal. Hereinafter, a process of determining a psychological state when the image processing apparatus 500 operates as a server computer and receives an instruction to execute a psychological state determination process from a client terminal will be illustrated.

Figure 16:
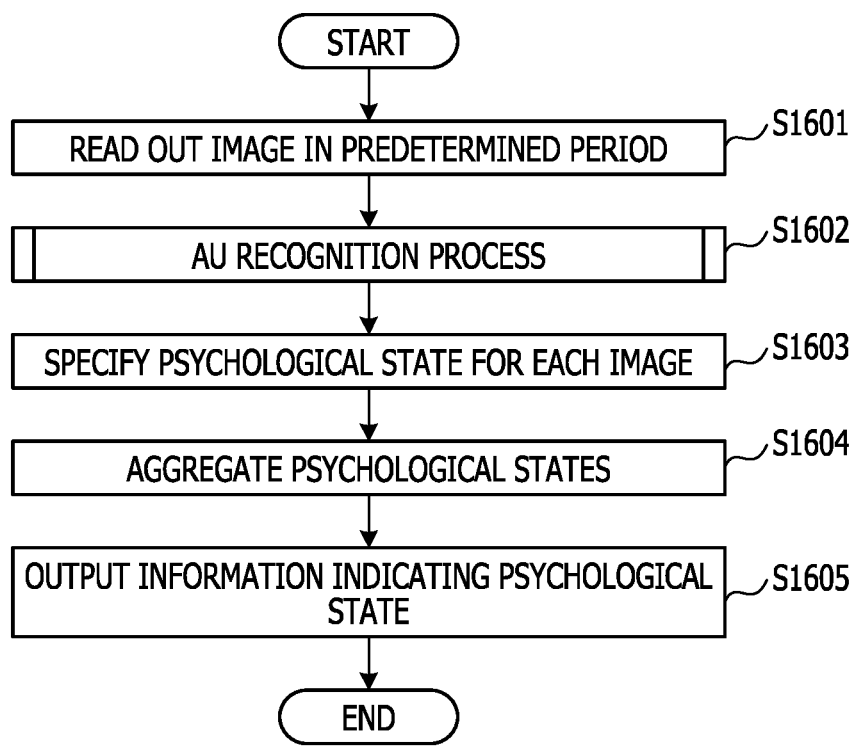
FIG. 16 is a diagram illustrating an operation flow of a psychological state determination process according to an embodiment.

FIG. 16 is a diagram illustrating an operation flow of a psychological state determination process according to an embodiment. For example, the controller 501 of the image processing apparatus 500 may start the operation flow of FIG. 16 when receiving an instruction to execute the psychological state determination process from the client terminal. Meanwhile, in a process separate from the operation flow of FIG. 16, the image processing apparatus 500 may receive from the client terminal a plurality of images of a person whose psychological state is to be determined, which is taken by a photographing device in a predetermined period, and may store the images in the storage unit 502.

In S1601, the controller 501 of the image processing apparatus 500 reads out the plurality of images of the person to be determined, taken in the predetermined period. The predetermined period may be, for example, a period for detecting the psychological state of the person. In an example, the controller 501 may execute a process on a plurality of images taken at predetermined intervals such as every 5 seconds to 20 seconds in a predetermined period such as 5 minutes to 10 minutes.

In S1602, the controller 501 executes an AU recognition process on the plurality of read images. In the AU recognition process, the controller 501 may detect an AU occurring in each of the plurality of images by, for example, executing the AU recognition process of FIG. 15 with each of the plurality of images as an input image.

In S1603, the controller 501 specifies the psychological state that is occurring for each image of the plurality of images. For example, the controller 501 may specify from the psychological state information 200 a psychological state that a set of AUs occurring in the image meets, to specify the psychological state occurring in the person shown in the image. As an example, when AU1, AU2, AU12, and AU25 are detected from the image, the controller 501 may detect the psychological state: joy, joyful surprise that corresponds to the set of AUs.

In S1604, the controller 501 aggregates for each psychological state the number of psychological states detected in the plurality of read images.

In S1605, the controller 501 outputs, for example, information indicating the psychological state of the person illustrated in the image obtained as a result of the aggregation. Then, the operation flow ends. For example, the controller 501 may generate display information for displaying the aggregated psychological state, and may output the display information to a client terminal that has transmitted an instruction to execute a psychological state determination process. When the display information is received, for example, the client terminal may display a display screen 1700 showing the psychological state of the person in the image for a predetermined period to a display device such as a display provided in the client terminal.

Figure 17:
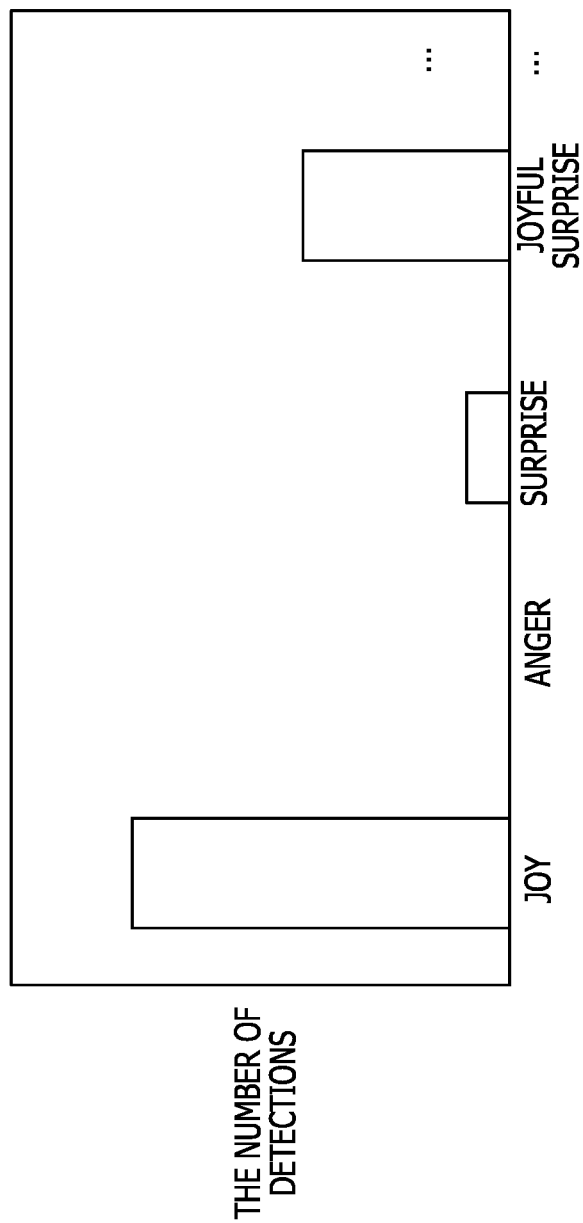
FIG. 17 is a diagram illustrating a display screen that represents a psychological state for a predetermined period according to an embodiment.

FIG. 17 is a diagram illustrating the display screen 1700 illustrating psychological states for a predetermined period according to an embodiment. A result of aggregation of psychological states of a person illustrated in an image detected in a predetermined period is shown on the display screen 1700. For example, the horizontal axis is the psychological state such as joy, anger, surprise, . . . , detected in a predetermined period, and the vertical axis is the number of detected psychological states. In the example of FIG. 17, emotions of joy, surprise, and joyful surprise are detected in the predetermined period, and it may be estimated that the target person is in these psychological states during the predetermined period. Then, information of these psychological states may be used, for example, to determine whether or not the psychological state of the person to be determined is stable, to manage a business of the person to be determined, to make a diagnosis of the person to be determined, and the like.

Although the embodiment has been illustrated above, the embodiment is not limited thereto. For example, the above-mentioned operation flow is an example, and the embodiment is not limited thereto. When possible, the operation flow may be executed by changing the order of the process, may include an additional process, or may omit a part of the process. For example, when the correction points specified based on the importance information are not used for specifying one or more feature points used for correction in the correction process, the operation flow of FIG. 8 may be omitted. Further, when the correction points specified based on the magnitude of motion are not used for specifying one or more feature points used for correction in the correction process, the operation flow of FIG. 11 may be omitted.

Further, in the above-described embodiment, a human being is used as an example for detecting a psychological state, but the embodiment is not limited thereto. For example, the detection target of the psychological state may be pets such as dogs and cats, and other animals.

Further, in the above-described embodiment, an example of detecting a motion in units of AUs as a facial motion is described, but the embodiment is not limited to the detection of a motion in units of AUs. For example, in another embodiment, a facial motion may be detected for each part such as eyebrow motion and mouth motion. Then, in this case, the correction points may be specified by using a recognition model that detects a motion for each part to generate importance information or specify features points with a small motion. For example, in the action unit information 100 of FIG. 1, since AU1, AU2, and AU4 are AUs related to the motion of the eyebrows, the controller 501 may specify correction points for the combined motion of the plurality of AUs.

Further, in the above-described embodiment, the reference image is used to perform the correction so that one or more feature points in the input image corresponding to the correction points match the arrangement of the one or more feature points in the reference image corresponding to the correction points. However, the embodiment is not limited thereto. In another embodiment, the reference image may not be used during the correction. For example, the controller 501 may correct the input image so that the one or more feature points of the input image corresponding to the correction points match the arrangement of the coordinates of predetermined feature points corresponding to the correction points specified for each AU from the reference image in advance.

Further, in the above-described embodiment, an example of specifying the correction points corresponding to the AU based on the importance information generated for one image in which the AU is occurring has been described, but the embodiment is not limited thereto. In another embodiment, the correction points corresponding to the AU may be specified based on a plurality of importance information generated from a plurality of images in which the AU is occurring.

Furthermore, the above-described embodiment, an example in which the above-described embodiment is applied to the detection of all AUs has been described, but the embodiment is not limited thereto. In another embodiment, the above embodiment may be applied to the detection of some AUs among the plurality of AUs, and another method may be used to detect the remaining AUs.

Further, in the above-described embodiment, an example of evaluating the importance based on the output value of the correct answer of the output layer of the recognition model has been described, but in another embodiment, the output value of the correct answer of the output layer of the recognition model may be used as an index indicating the importance as it is.

Further, in the above-described embodiment, an example in which the correction points are specified from the region of a predetermined range of importance having a range equal to or smaller than the first threshold value and equal to or larger than the second threshold value, stored in the storage unit 502 as the correction point information 900, and referred to in the correction process has been described, but the embodiment is not limited thereto. For example, in another embodiment, the controller 501 may select one or more points corresponding to an image region having an importance equal to or smaller than the first threshold value indicated by the importance information, among a plurality of feature points detected from the input image.

In the above-described embodiment, for example, in the process of S1503 in FIG. 15, the controller 501 of the image processing apparatus 500 operates as the detection part 511. Further, for example, in the process of S1504 of FIG. 15, the controller 501 of the image processing apparatus 500 operates as the selection part 512. For example, in the process of S1505 of FIG. 15, the controller 501 of the image processing apparatus 500 operates as the correction part 513. For example, in the process of S1506 of FIG. 15, the controller 501 of the image processing apparatus 500 operates as the determination part 514. For example, in the process of S1605 of FIG. 16, the controller 501 of the image processing apparatus 500 operates as the output part 515.

Figure 18:
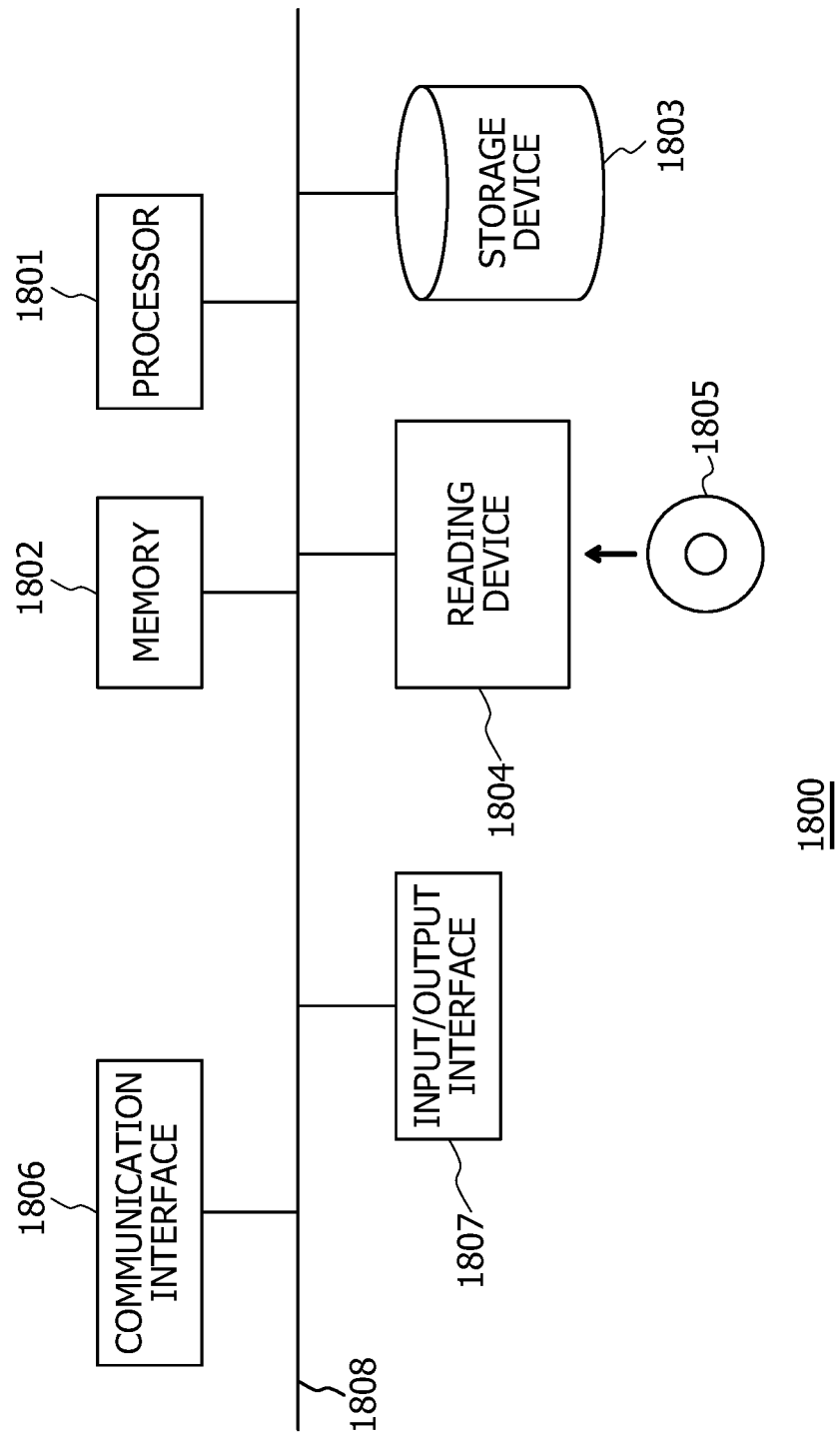
FIG. 18 is a diagram illustrating a hardware configuration of a computer for implementing the image processing apparatus according to the embodiment.

FIG. 18 is a diagram illustrating a hardware configuration of a computer 1800 for implementing the image processing apparatus 500 according to an embodiment. The hardware configuration for implementing the image processing apparatus 500 of FIG. 18 includes, for example, a processor 1801, a memory 1802, a storage device 1803, a reading device 1804, a communication interface 1806, and an input/output interface 1807. The processor 1801, the memory 1802, the storage device 1803, the reading device 1804, the communication interface 1806, and the input/output interface 1807 are connected to each other via, for example, a bus 1808.

The processor 1801 may be, for example, a single processor, a multiprocessor, or a multicore. The processor 1801 provides some or all of the functions of the controller 501 described above by executing, for example, a program describing the procedure of the operation flow described above using the memory 1802. For example, the processor 1801 of the image processing apparatus 500 operates as the detection part 511, the selection part 512, the correction part 513, the determination part 514, and the output part 515 by reading and executing a program stored in the storage device 1803.

The memory 1802 is, for example, a semiconductor memory, and may include a RAM area and a ROM area. The storage device 1803 is, for example, a semiconductor memory such as a hard disk or a flash memory, or an external storage device. RAM is an abbreviation for Random Access Memory. ROM is an abbreviation for Read Only Memory.

The reading device 1804 accesses a removable storage medium 1805 according to an instruction of the processor 1801. The removable storage medium 1805 is realized by, for example, a semiconductor device, a medium in which information is input/output by a magnetic action, a medium in which information is input/output by an optical action, and the like. The semiconductor device is, for example, a Universal Serial Bus (USB) memory. Further, the medium in which information is input/output by a magnetic action is, for example, a magnetic disk. The medium in which information is input/output by an optical action are, for example, CD-ROM, DVD, Blu-ray®, Disc, etc. CD is an abbreviation for Compact Disc. DVD is an abbreviation for Digital Versatile Disk.

The storage unit 502 described above may include, for example, a memory 1802, the storage device 1803, and the removable storage medium 1805. For example, the storage device 1803 of the image processing apparatus 500 stores the action unit information 100, the psychological state information 200, and the correction point information 900.

The communication interface 1806 communicates with another apparatus according to an instruction of the processor 1801. In an example, the communication interface 1806 may transmit and receive data to and from a photographing device such as a camera that captures an image by wired or wireless communication, or another device such as a client terminal. The communication interface 1806 is an example of the above-mentioned communication unit 503.

The input/output interface 1807 may be, for example, an interface between an input device and an output device. The input device is, for example, a device such as a keyboard, a mouse, a touch panel, or the like that receives an instruction from a user. The output device is, for example, a display device such as a display, and an audio device such as a speaker.

Each program according to an embodiment is provided to the image processing apparatus 500, for example, in the following form.
  (1) Each program may be pre-installed in the storage device 1803.
  (2) Each program may be provided by the removable storage medium 1805.
  (3) Each program may be provided from a server such as a program server.

The hardware configuration for implementing the image processing apparatus 500 described with reference to FIG. 18 is an example, but the embodiment is not limited thereto. For example, some of the above configurations may be deleted or new configurations may be added. In another embodiment, for example, some or all of the functions of the above-mentioned controller 501 may be implemented as hardware by Field Programmable Gate Array (FPGA), System-on-a-Chip (SoC), Application Specific Integrated Circuit (ASIC), Programmable Logic Device (PLD), or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing method executed by a computer, the method comprising:
   detecting a plurality of feature points of a face from an input image;
   referring to importance information that indicates an importance of a region within an image in a process of detecting a predetermined facial motion from the image;
   selecting, from the plurality of feature points detected by the detecting, one or more points that correspond to an image region including an importance indicated by the importance information equal to or smaller than a first threshold value;
   correcting the input image by using the one or more points selected by the selecting, to generate a corrected image; and
   determining whether or not the predetermined facial motion is occurring in the input image, based on an output obtained by inputting the corrected image to a recognition model.

2. The image processing method according to claim 1, wherein the image region includes the importance equal to or smaller than the first threshold value and equal to or larger than a second threshold value.

3. The image processing method according to claim 1, wherein the selecting includes selecting the one or more points that correspond to the feature points in which a difference between each of a plurality of feature points included in a first image in which the predetermined facial motion is occurring and each of a plurality of feature points included in a second image in which the predetermined facial motion is not occurring is equal to or smaller than a third threshold value, the second image corresponding to the first image.

4. The image processing method according to claim 1, wherein the recognition model is a learned model generated by executing a machine learning that uses a plurality of corrected images as teacher data, the plurality of corrected images being obtained by correcting, by using the image region, a plurality of images labeled with an occurrence of the predetermined facial motion and a plurality of images labeled with no occurrence of the predetermined facial motion.

5. The image processing method according to claim 1,
   wherein the predetermined facial motion is an action unit that is a unit of the facial motion, and
   the method further comprising:
   outputting information that indicates a psychological state of the face appearing in the input image, based on information on a presence or absence of an occurrence of the action unit in the determining in the input image and information on a presence or absence of an occurrence of another action unit in the input image.

6. A non-transitory computer-readable recording medium having stored a program that causes a computer to execute a process, the process comprising:
   detecting a plurality of feature points of a face from an input image;
   referring to importance information that indicates an importance of a region within an image in a process of detecting a predetermined facial motion from the image;
   selecting, from the plurality of feature points detected by the detecting, one or more points that correspond to an image region including an importance indicated by the importance information equal to or smaller than a first threshold value;
   correcting the input image by using the one or more points selected by the selecting, to generate a corrected image; and
   determining whether or not the predetermined facial motion is occurring in the input image, based on an output obtained by inputting the corrected image to a recognition model.

7. An image processing apparatus comprising:
   a memory; and
   a processor coupled to the memory and configured to:
   detect a plurality of feature points of a face from an input image;
   refer to importance information that indicates an importance of a region within an image in a process of detecting a predetermined facial motion from the image;
   select, from the detected plurality of feature points, one or more points that correspond to an image region including an importance indicated by the importance information equal to or smaller than a first threshold value;
   correct the input image by using the selected one or more points, to generate a corrected image; and
   determine whether or not the predetermined facial motion is occurring in the input image, based on an output obtained by inputting the corrected image to a recognition model.

* * * * *